United States Patent Office 3,064,045
Patented Nov. 13, 1962

3,064,045
MAGNESIUM SALT OF THIOGLYCOLIC ACID
Du Yung Hsiung, Chicago, Ill., assignor to The Gillette Company, Boston, Mass., a corporation of Delaware
No Drawing. Filed Nov. 9, 1956, Ser. No. 621,202
2 Claims. (Cl. 260—526)

This invention relates to a new composition of matter and pertains more specifically to a novel magnesium salt of thioglycolic acid and to its corresponding disulfide.

Certain magnesium complexes with thioglycolic acid have been hitherto described but these materials have had the magnesium atom linked directly to the mercapto sulfur atom. This is undesirable because they have low solubility, have a low reactive pH, and have an undesirably high sulfur content.

It has now been found that by reacting in aqueous medium one mole of magnesium carbonate with two moles of thioglycolic acid there may be prepared a magnesium thioglycolate having the following formula:

$$HS-CH_2-COO-Mg-OOC-CH_2-SH$$

This compound may be isolated in the form of a dihydrate which is a colorless solid material, stable in air and substantially free from odor. The dry hydrate readily dissolves in water, producing a solution having a pH of about 6.5 at a concentration of 0.1 N and at a temperature of 25° C. The solubility of the dihydrate in water at 23° C. is 101 gm. per 100 gm. of water. It may be converted into the anhydrous salt and in such form it has a solubility of 86 gm. per 100 gm. of water at 23° C.

The corresponding disulfide may be prepared from the magnesium thioglycolate described above by oxidation of the latter in aqueous solution with hydrogen peroxide or any other suitable oxidizing agent, or it may be prepared by reacting with one mole of dithiodiglycolic acid one mole of magnesium carbonate. The magnesium salt of the disulfide thus produced has the formula

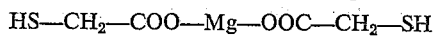

This magnesium salt may likewise be isolated in the form of a dihydrate which is a stable solid material substantially free from color and from odor. The disulfide salt is similarly very soluble in water, producing a solution having a pH of about 7.5 at a concentration of 0.1 N and at 25° C. The solubility of the dihydrate is 38 gm. per 100 gm. of water. The dihydrate can also be converted into the anhydrous salt.

The following specific examples are intended to illustrate more clearly the nature of the present invention, but are not intended as a limitation on the scope thereof.

*Example 1*

To a two molar aqueous solution of thioglycolic acid there was added slowly and with stirring at room temperature one mole of finely divided magnesium carbonate. Because of the exothermic nature of the reaction it was necessary to cool the reaction mixture throughout the course of the reaction, and in order to avoid excessive decomposition of the thioglycolic acid it was found preferable to maintain an atmosphere of nitrogen or other inert gas above the reaction mixture. After addition of the magnesium carbonate was completed, the mixture was heated at reduced pressure to remove as much water as possible, following which ethanol was added to precipitate the magnesium thioglycolate which was then separated by filtration, washed with alcohol, and dried in air. The resulting magnesium thioglycolate dihydrate was a colorless solid having an equivalent weight of 121 (molecular weight 242) as determined by titration of the mercapto groups with iodine and by magnesium determination, and having the following formula:

Upon analysis, it was found to have the following composition:

|  | Found | Calculated |
|---|---|---|
| Carbon | 20.19 | 19.81 |
| Hydrogen | 4.31 | 4.16 |
| Sulfur | 26.31 | 26.43 |
| Magnesium | 10.08 | 10.03 |

Instead of magnesium carbonate there could be employed magnesium oxide, magnesium hydroxide, or basic magnesium carbonate with essentially the same results. Instead of ethanol, isopropanol or acetone or ethyl ether could be employed for precipitation of the magnesium thioglycolate.

The dry solid material was substantially colorless and substantially free from odor upon storage in air at room temperature for more than ten months.

Some of the dihydrate was converted into an almost anhydrous material by azeotropic distillation of the dihydrate with xylene. This anhydrous magnesium thioglycolate, having an equivalent weight of 103 (molecular weight 206), was substantially colorless and substantially free from odor upon storage in air at room temperature.

*Example 2*

One mole of the magnesium thioglycolate dihydrate prepared as described in Example 1 was dissolved in 250 ml. of water, and there was added to the solution at room temperature with thorough stirring 0.5–0.55 mole of hydrogen peroxide (0.5 mole is the theoretical amount). After standing for one-half hour at room temperature the solution was concentrated and ethanol was added to the solution to precipitate a white solid material which was then separated by filtration and dried in air or in an oven at 100° C. overnight. The resulting magnesium dithioglycolate dihydrate was a colorless material having an equivalent weight of 120 (molecular weight 240) as determined by disulfide and magnesium determination. It was stable on storage in air over a period of more than six months at room temperature, and was substantially free from odor. It possessed the following formula:

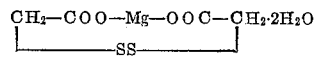

Upon analysis, it was found to have the following composition:

|  | Found | Calculated |
|---|---|---|
| Carbon | 20.00 | 19.97 |
| Hydrogen | 3.17 | 3.35 |
| Sulfur | 26.16 | 26.66 |
| Magnesium | 10.11 | 10.11 |

The same compound could be prepared by treating an aqueous solution containing one mole of dithiodiglycolic acid with one mole of magnesium carbonate, followed by concentration and separation of the magnesium salt by the addition of ethanol as described above. The dihydrate, likewise, was converted into an almost anhydrous salt by azeotropic distillation of the dihydrate with xylene.

Solid magnesium thioglycolate exhibits low irritancy on skin, is stable, and develops very little odor in comparison with other thioglycolate salts. It was found that solid ammonium thioglycolate lost its SH titer completely after being stored for two months; solid sodium thioglycolate lost 80% of its SH titer in three months, while solid magnesium thioglycolate lost only about 5% of its SH titer after being stored for eleven months under similar conditions. Likewise, solid magnesium dithiodiglycolate was stable and remained odorless after being stored for more than six months, while diammonium dithiodiglycolate developed a very unpleasant odor after one or two weeks under similar conditions. Magnesium thioglycolate and magnesium dithiodiglycolate, therefore, are especially suitable for use in powdered hair waving compositions, although lotions, particularly aqueous lotions, prepared from them are equally satisfactory.

Typical examples of magnesium thioglycolate compositions which, after dissolution in water in the concentrations indicated, are suitable for use in the permanent waving of hair are given below:

1. 0.6 M magnesium thioglycolate
   0.5 M 2-amino-2-methyl-1,3-propanediol
2. 0.6 M magnesium thioglycolate
   0.3 M magnesium sulfate
   0.5 M 2-amino-2-methyl-1,3-propanediol
3. 0.6 M magnesium thioglycolate
   0.15–0.3 M magnesium dithiodiglycolate
   0.5 M 2-amino-2-methyl-1,3-propanediol
4. 0.6 M magnesium thioglycolate
   0.4 M sodium glycinate
5. 0.6 M magnesium thioglycolate
   0.5 M diisopropanolamine
6. 0.6 M magnesium thioglycolate
   0.4 M sodium salt of N-methyl taurine Although specific embodiments of the invention have been described herein, it is not intended to limit the invention solely thereto, but to include all of the obvious variations and modifications within the spirit and scope of the appended claims.

I claim:

1. As a composition of matter, a material having the formula $(HSCH_2COO)_2Mg$.
2. As a composition of matter, a dihydrate of the material defined in claim 1.

References Cited in the file of this patent
UNITED STATES PATENTS 2,631,965  Schnell _____ Mar. 17, 1953

FOREIGN PATENTS 1,003,963  France _____ Nov. 21, 1951

OTHER REFERENCES

Hoshall: Assoc of Official Agricultural Chemists Journal, vol. 23 (1940), pp. 727–734. (Copy in Lib.)